United States Patent [19]

Wilson

[11] Patent Number: 4,839,741
[45] Date of Patent: Jun. 13, 1989

[54] IMAGE REPRODUCING APPARATUS WITH CCD SCANNER AND BUBBLE JET PRINTER SIMULTANEOUSLY DRIVEN BY A COMMON BELT IN OPPOSITE DIRECTIONS AND OPERATED ASYNCHRONOUSLY

[75] Inventor: Charles D. Wilson, Pittsford, N.Y.

[73] Assignee: Xerox Corporation, Stamford, Conn.

[21] Appl. No.: 129,195

[22] Filed: Dec. 7, 1987

[51] Int. Cl.$^4$ .......................... H04N 1/14; H04N 1/04
[52] U.S. Cl. ..................................... 358/293; 358/285; 358/294
[58] Field of Search ................. 358/256, 293, 294, 285

[56] References Cited

U.S. PATENT DOCUMENTS

| | | | |
|---|---|---|---|
| 3,832,484 | 8/1974 | Tanaka | 358/289 |
| 4,321,627 | 3/1982 | Hooker et al. | 358/286 |
| 4,348,697 | 9/1982 | Takahashi et al. | 358/293 |
| 4,739,415 | 4/1988 | Toyono et al. | 358/293 |

FOREIGN PATENT DOCUMENTS

| | | | |
|---|---|---|---|
| 54-10730 | 1/1979 | Japan | 358/293 |
| 58-88966 | 5/1983 | Japan | 358/293 |
| 60-141072 | 7/1985 | Japan | 358/293 |
| 2168216 | 6/1986 | United Kingdom | 358/293 |

Primary Examiner—James J. Groody
Assistant Examiner—Randall S. Svihla
Attorney, Agent, or Firm—Ronald F. Chapuran

[57] ABSTRACT

This invention is a scanning array for sequentially converting portions of an image of a document into digital format, a print head for sequentially printing those portions of the image onto a receiving means, logic circuitry interconnecting the scanning array and the print head, and a stepper motor connected to the scanning array and the print head to step the scanning array in a first direction while at the same time stepping the print head in a second direction. Control circuitry is also provided to enable the scanning array to scan in the first direction asynchronously with the print head printing the image in the second direction. A second stepper motor is included to index the copy sheet past the scanning array and the print head.

5 Claims, 4 Drawing Sheets

IMAGE REPRODUCING APPARATUS WITH CCD SCANNER AND BUBBLE JET PRINTER SIMULTANEOUSLY DRIVEN BY A COMMON BELT IN OPPOSITE DIRECTIONS AND OPERATED ASYNCHRONOUSLY

The invention relates generally to a combination scanner and printer, and in particular, to a one drive system for simultaneously driving the scanner and the printer and yet providing for synchronous or asynchronous operation between the scanner and the printer.

BACKGROUND OF THE INVENTION

The prior art is replete with systems for scanning a document and printing a reproduction of the document. For example, U.S. Pat. No. 4,321,627 discloses a scanner system for an ink jet printer capable of producing a copy without intermediate data storage or processing using an incremental drive to move a carriage. U.S. Pat. No. 3,832,484 discloses a method for reproducing a mirror image of a copy comprising a scanning head moving in a synchronized manner. The mirror image is produced one elemental area at a time on a record medium.

A difficulty with prior art systems is that they are generally relatively complex and costly requiring large memory buffers or character generating circuits.

It is an object of the present invention to provide a new and improved scanning and print system. It is another object of the present invention to provide a single drive to move a scanner in a first direction simultaneously with the movement of a print head in a second direction to reproduce the image on a copy sheet. It is another object of the present invention to provide a scanning and printing system driven by a single drive system wherein the scanning and printing can be performed asynchronously. Further objects of the present invention will become apparent as the following description proceeds and the features characterizing the invention will be pointed out with particularity in the claims annexed to and forming a part of this specification.

SUMMARY OF THE INVENTION

Briefly, the present invention is a scanning array for sequentially converting portions of an image of a document into digital format, a print head for sequentially printing those portions of the image onto a receiving means, logic circuitry interconnecting the scanning array and the print head, and a stepper motor connected to the scanning array and the print head to step the scanning array in a first direction while at the same time stepping the print head in a second direction. Control circuitry is also provided to enable the scanning array to scan in the first direction asynchronously with the print head printing the image in the second direction. A second stepper motor is included to index the copy sheet past direction. A second stepper motor is included to index the copy sheet past the scanning array and the print head.

For a better understanding of the present invention, reference may be had to the accompanying drawings wherein the same reference numerals have been applied to like parts and wherein.

DESCRIPTION OF THE PREFERRED EMBODIMENT

Figure 1:
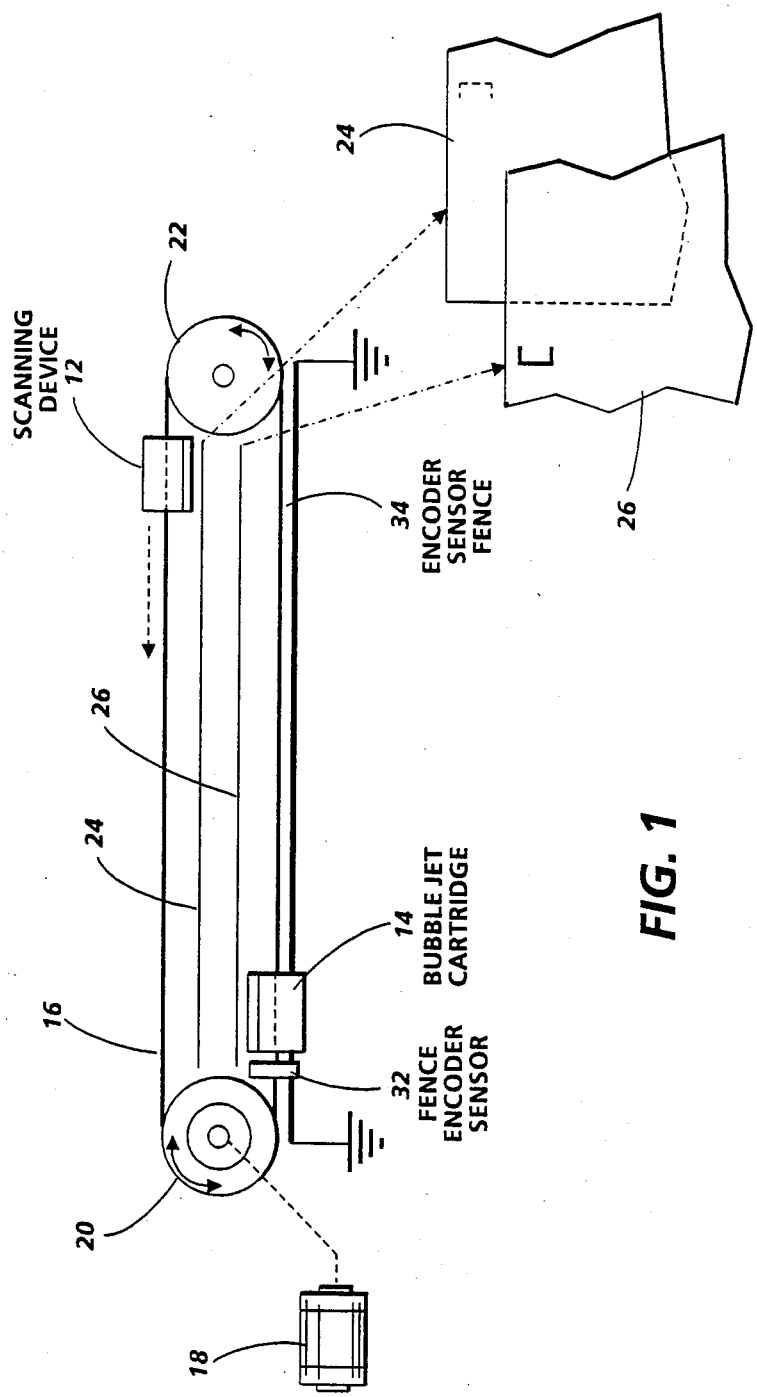
FIG. 1 is an elevational view of the scanner/printer in accordance with the present invention.
Figure 2:
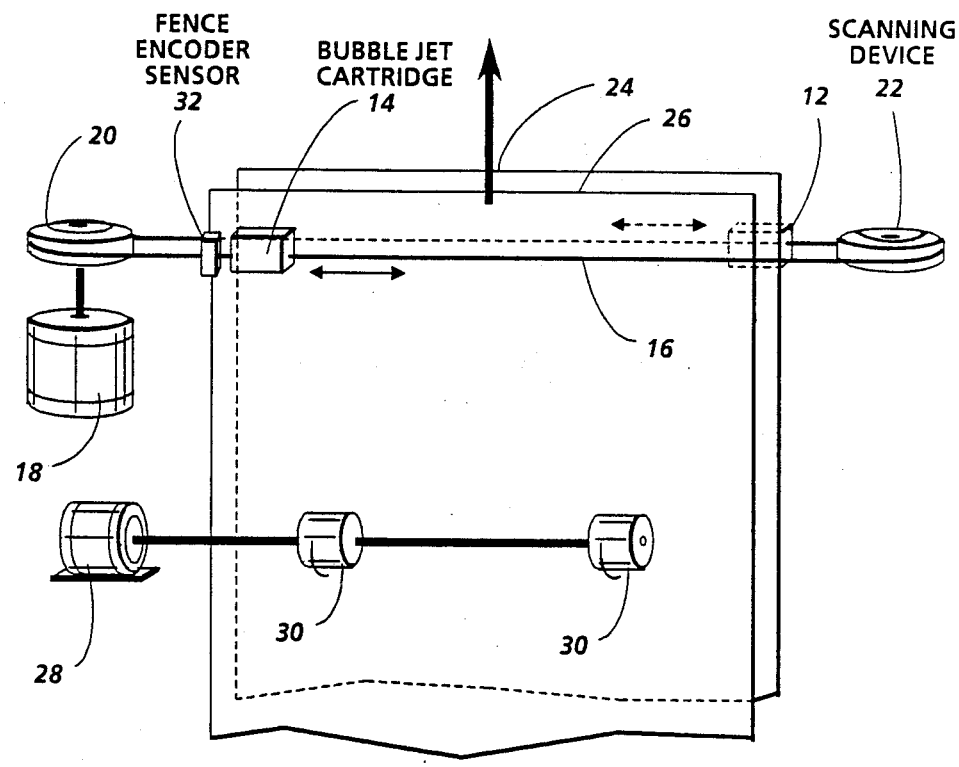
FIG. 2 is a bottom view of the scanner/printer system in accordance with the present invention.

With reference to FIGS. 1 and 2, there is illustrated a side and bottom view of a combination scanner/printer drive mechanism in accordance with the present invention. A scanning device or array 12 such as a CCD array and a bubble jet cartridge 14 are affixed to a taut band such as a cable or drive belt 16 and are step driven by stepper motor 18. The scanning device 12 and a bubble jet cartridge 14 are positioned as illustrated, such that incremental step directions are always 180° out of phase. The stepper motor 18 is suitably coupled to a driving roll 20 to drive the cable 16 appropriately entrained about the drive wheel 20 and an idler roll 22.

The scanner array 12 or CCD array is positioned over a small increment or slice of an original document 24 that is fixedly secured on a suitable (not shown) supporting device in a relationship to be scanned by the scanner 12 as the scanner is driven by the stepper motor 18 in the direction of the cable 16. A copy sheet 26 is likewise secured on a not shown supporting frame or holder to be in the path of the bubble jet cartridge as the bubble jet cartridge 14 is driven in the direction of the cable 16. It should be understood that the essence of the invention is the relative movement of the scanner 12 with respect to the original document 24 and the relative movement of the bubble jet cartridge 14 with respect to the copy sheet 26 and that is within the scope of the invention to hold either the scanner 12 or the bubble jet cartridge 14 or both stationary while there is movement of the original 24 and the copy sheet 26 with respect to the scanner 12 and the bubble jet cartridge 14 respectively.

The scanner array 12 positioned over a small increment or slice of the original 24 scans or reads the original and this slice of information is then conditioned in suitable logic circuitry and transferred to the bubble jet cartridge 14. The bubble jet cartridge 14 then selectively activates corresponding jets to deposit ink on the copy sheet 26 to produce a reproduction of the scanned original 24. The stepper motor 18 then steps both the scanner 12 and the bubble jet cartridge 14 to the next position and the sequence is repeated until a full line has been read and printed.

A stepper motor 28 suitably connected to a copy sheet feed wheels 30 then increments the vertical position of the copy sheet a distance equal to the scanning vertical width of scanning array and the next line of image or text from the original 24 is scanned and printed. This sequence continues until a full page is read and printed. In a preferred embodiment, the scanning vertical height is approximately 50 bits or approximately 1/6" for each scanned line. After each reading of 50 bits there is a 0.003" step for the next reading and this sequence of 0.003 steps continues until the end of the line.

As an index control, there is provided a fence encoder sensor 32 and an encoder sensor fence 34 preferably extending 8½" or the width of a copy sheet. The fence 34 is optically exposed to provide 300 indications per inch. A sensor traveling past the fence 34 determines the point of the end of the copy sheet to index to the beginning of the next line. It should be noted that the scanner 12 and bubble jet cartridge 14 can be of any reasonable, arbitrary width. In a preferred embodiment, a width of 50 bits is contemplated, thus, for a 10 point type this results in an array height of about 1/6". A page could be read/printed in about one minute with resolutions of approximately 300 spots per linear inch or 90,000 spots per square inch.

Figure 3:
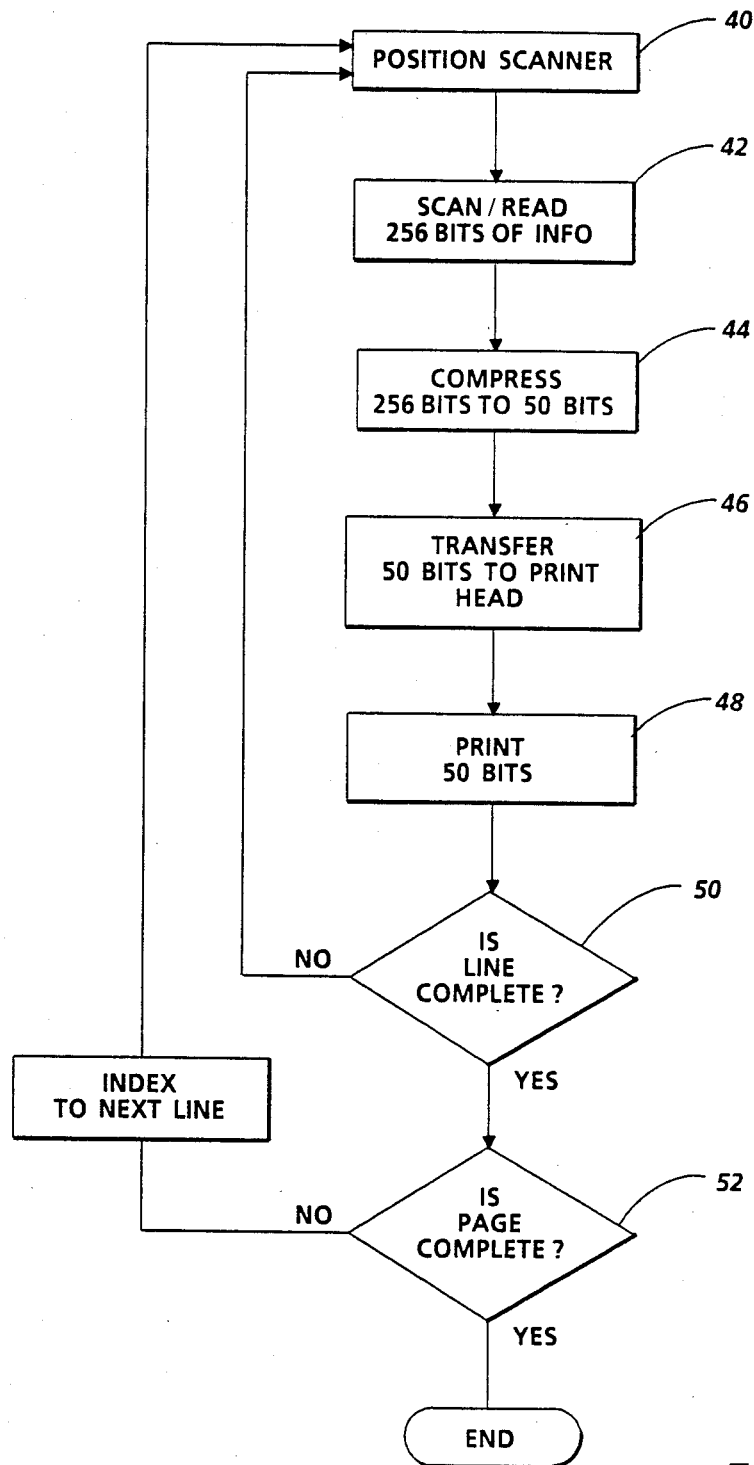
FIG. 3 is a flow chart of the sequence of operation of the printer scanner in accordance with the present invention.

With reference to FIG. 3, there is illustrated a flow chart of a sequence of operation in accordance with the present invention. Beginning at block 40, the scanner is positioned at the beginning of a line to be scanned. In block 42, a small slice or portion of the information of the document is scanned and read preferably a 0.003" horizontal portion that is 50 bits high (vertical). In block 44, the portion of slice of information that is scanned and read at block 42 is converted to digital data, 50 bits per slice or portion in a block 46 the 50 bits is transferred to the bubble jet cartridge. In block 48, the 50 bits are printed and then the first decision must be made at block 50, is the line complete or not? If the line is not complete, that is, the last portion or slice of a line has not been read, the sequence is repeated to read and print another portion or slice of the line. Ultimately, the line is complete and the decision block 52 is addressed, is the page complete? Assuming the page is not complete, stepper motor 28 will index the copy sheet to the next line where the process is repeated to complete another line until finally the entire page is completed.

Figure 4:
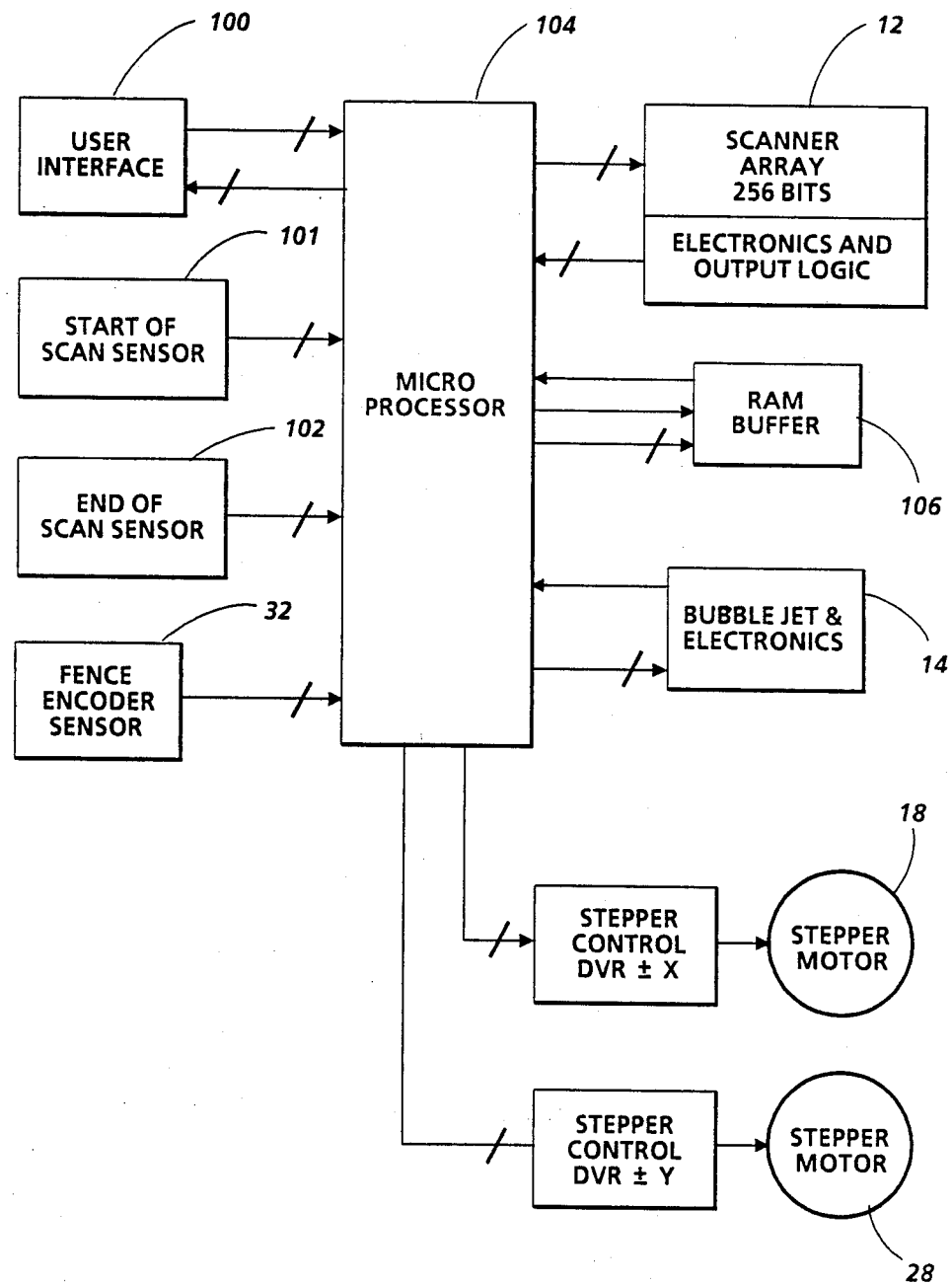
FIG. 4 is a block diagram of the control of the scanner/printer system in accordance with the present invention.

With reference to FIG. 4, there is illustrated a block diagram of a typical control in accordance with the invention.

The microprocessor 104 is the source of electronic and logic control, typically an industrial, commercial version such as an Intel 8051 or 8751 could be used. It should be noted, however, that other single chip micros with on-board memory, control, and Input/Output capability could also be utilized. Memory and logic control, such as the flow chart illustrated in FIG. 3, would be imbedded in the microprocessor memory and logic and control the operation. The User Interface 100 provides an interface for the human operator. Typically, a keyboard, switches and visual indicators of the machine would be accessed by the user to control the operation and initiate a scan and print cycle. The User Interface 100 provides electronic control input signals to the microprocessor 104 and the microprocessor can provide status signals to the user via output signals.

The fence encoder sensor 32 provides positional and timing information pertaining to the position of the bubble jet cartridge 14 and the position of the scanner array 12 through an Input or Interrupt input of the microprocessor 104. Using well known software techniques, the position of the scanner array 12 and print head cartridge 14 are thus derived and can be precisely controlled to any desired position. The stepper motors 18 and 28 are driven from controlled signals from the microprocessor 104 via stepper control drivers and are used to control the precise location of the cartridge 14, the scanner array 12 and also will index the paper to the next line to be scanned and printed. Start of scan sensor 101 and end of scan sensor 102 are optional sensors that may be used to determine start and end of scan positions. The encoder sensor fence 34 can also be encoded in a known art manner to also derive start and end of scan positions and thus eliminate the need for sensors 101 and 102.

With the original document 24 in place and properly secured and with the copy sheet 26 properly in place and secured, the operator can further program and initiate the scan and print operation via the User Interface 100. The microprocessor then controls the location of elements and sequence of operation.

The scanner array 12 is controlled by the microprocessor 104 to acquire the first slice of original information. Upon acquiring the first slice of information, the microprocessor indexes the scanner array 12 and the bubble jet cartridge 14 to the next incremental image position via the stepper motor 18 and taut band mechanism. The microprocessor 104 includes program logic to scan a first portion of the document, means to delay printing said first portion a first time period, means to scan a second portion of the document, and means to delay printing said second portion a second time period different from the first time period.

The first scanned slice of 256 bits is transferred to an electronics and output logic block which may be integral to the array device or may be transferred either serially or parallel to the microprocessor 104 for compression of the 256 bits of information to a compressed array of 50 bits of image information in direct correlation to the original image slice. Image compression algorithms to accomplish this compression can be either imbedded in the electronics and output logic or can be accomplished within the microprocessor using known software image compression techniques. RAM buffer 106 can be utilized to store either compressed or uncompressed image data dependent upon the software configuration and can be used for other embellished operations such as multiple prints of the same information, recovery from interrupted operation, deletions or editing of the original.

The scanned compressed and or buffered information is then routed to the bubble jet cartridge 14 via a serial high speed or parallel data bus under control of the microprocessor and software. The compressed 50 bits of information is directed to internal electronic positioning registers and are further directed to individual bubble jets within the array of 50 bubble jet chambers. Under microprocessor timing control, the bubble jet cartridge 14 is instructed to print its registered data on command. While the bubble jet is printing its arrayed information, the scanner array 12 is simultaneously acquiring the next slice of original image information having been previously positioned. This process of scanning and printing is iterated again and again per the flow chart of FIG. 3 until the page is completed. While simultaneous scanning and printing is perceived, it should be noted that the printing is in fact delayed one positional step or sequence behind the scan operation and under full microprocessor monitor and control. Thus, while synchronous operation is perceived, the operation is in reality asynchronous and would be interrupted by the microprocessor as required due to microprocessor processing time lags or even by operator interruptions as desired.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. An apparatus for reproducing a document, comprising:
   means for holding the document,
   receiving means on which the document is to be reproduced,
   a scanning array for sequentially converting portions of the document into digital signals,
   a print head for sequentially printing reproductions of the portions of the document on the receiving means,
   logic circuitry interconnecting the scanning array and the print head for converting the digital signals to print head signals, the logic circuitry including means for causing the scanning array to scan a first portion of the document, means for causing the print head to delay printing a reproduction of the first portion of the document for a first time period, means for causing the scanning array to scan a second portion of the document, and means for causing the print head to delay printing a reproduction of the second portion of the document for a second time period different from the first time period,
   a driver to which the scanning array and the print head are mechanically secured, and
   a first stepper motor connected to the driver to drive the scanning array in a first direction while at the same time driving the print head in a second direction in order to print a reproduction of the document on the receiving means.

2. The apparatus of claim 1 wherein the first stepper motor drives the print head in a transverse direction relative to the receiving means and further including a second stepper motor for sequentially indexing the receiving means past the print head.

3. The apparatus of claim 2 wherein the driver is a belt and further including an encoder sensor and a sensor fence disposed relative to the belt to control the driving of the scanning array and the print head by the first stepper motor and the indexing of said receiving means by said second stepper motor.

4. The apparatus of claim 1 wherein the logic circuitry causes the print head to print a reproduction of one portion of the document on said receiving means while the scanning array scans a succeeding portion of the document, with the delays between the scanning of the portions of the document and the printing of the respective reproductions of the portions of the document each being equivalent to one step of the first stepper motor.

5. The apparatus of claim 1 wherein the logic circuitry causes the scanning of the portions of the document and the printing of the respective reproductions of the portions of the document to be performed asynchronously.

* * * * *